INVENTOR
GEORGE J. MOSS, JR.
BY
ATTORNEY

United States Patent Office 3,449,710
Patented June 10, 1969

3,449,710
CONTROLLED THRESHOLD DETECTOR FOR
SONAR APPLICATIONS
George J. Moss, Jr., Bethesda, Md., assignor to the
United States of America as represented by the Secretary of the Navy
Filed Oct. 18, 1967, Ser. No. 676,686
Int. Cl. G01s 9/66
U.S. Cl. 340—3        9 Claims

ABSTRACT OF THE DISCLOSURE

An apparatus for detecting echo returns from narrow-beam Sonar sets wherein a decision circuit receives one input, which is a delayed signal proportional to an echo pulse received at the transducer, and wherein the decision circuit receives a second input which is a fixed number of decibels below the peak of the echo pulse signal. The output of the decision circuit changes abruptly when the amplitudes of the two inputs are equal and the output signal is independent of the amplitude of the echo pulse.

The invention described herein may be manufactured and used by or for the Government of the United States of America for governmental purposes without the payment of any royalties thereon or therefor.

BACKGROUND OF THE INVENTION

The present invention relates to an echo pulse detector for Sonar applications and more particularly to a controlled threshold detector which permits accurate detection of echo pulses even when pulse amplitudes vary. As a result, this invention provides depth readings that are independent of the echo pulse amplitudes.

In the field of Sonar echo detection it has been the general practice to filter and rectify the incoming signal and to pass the resulting rectified signal through a threshold device which generates a pulse output when the incoming voltage level passes a specified fixed threshold. This pulse is then used to mark graphic recorders or to stop or otherwise operate electronic counters which measure depth digitally by counting elapsed time since transmission of the acoustic pulse. Although such devices have served the purpose, they have not proved entirely satisfactory under all conditions of service because variations in amplitude of the echo signal, due to variations in transmission loss or bottom reflection loss, often result in the amplitude of the returning signal being of a value which is less than the fixed threshold value so that the presence of the returning signal is not detected. In addition, when the threshold level of the prior art detectors was set low enough to detect the weaker pulses, the devices would trigger on the side-lobes of the stronger pulses so that the device would fail to distinguish between main-lobe and side-lobe arrivals.

Still another technique and apparatus has been used by the ASW Division of General Instrument Corporation wherein the time that the voltage generated by an echo pulse passes each of a series of closely-spaced thresholds is recorded digitally in active registers. The detector then counts back a given number of levels from a first threshold which is not crossed and samples the associated digital number, which is interpreted as the leading-edge arrival time of the echo pulse. The effective threshold is always, to within a quantization error, a specified number of decibels below the peak of the pulse. Large variations in signal level therefore do not affect the depth reading or the side-lobe discrimination capability, as long as the main-lobe signal amplitude exceeds the side-lobe signal amplitude by a given amount. Although the use of this apparatus and technique greatly reduces many problems, it involves complex circuitry with associated high cost and the unusual output format of this apparatus makes interfacing with existing bathymetric Sonar sets difficult and expensive.

SUMMARY OF THE INVENTION

Therefore, the general purpose of this invention is to provide a controlled threshold echo detector which embraces all the advantages of similarly employed detectors and possesses none of the aforedescribed disadvantages. To attain this the present invention contemplates a unique system arrangement whereby the detector facilitates depth reading independently of the amplitude of the echo pulse.

An object of the present invention is the provision of a controlled threshold echo detector which makes depth readings the accuracies of which are independent of the amplitudes of the echo pulses.

Another object is to provide a detector which permits detection of an echo pulse a specified number of decibels below the peak of the pulse when pulse amplitudes are varied.

DESCRIPTION OF THE PREFERRED EMBODIMENTS

Figure 1:
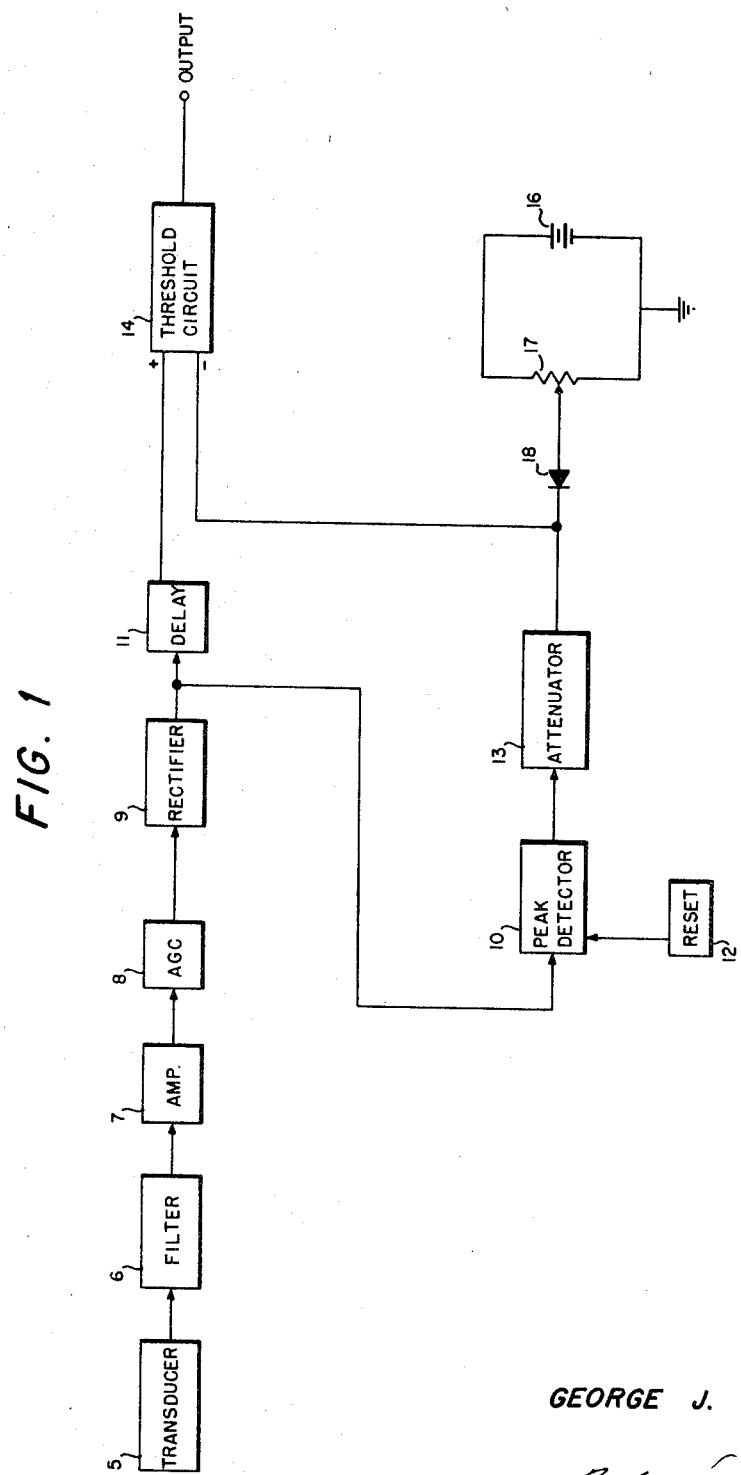
FIG. 1 shows a block diagram of one embodiment of the invention.

Referring now to the drawings, there is shown in FIG. 1 a basic configuration of the invention. The echo received by the transducer 5 is applied to the filter 6, the purpose of which is to reduce noise which is outside of the passband. The signal is then suitably amplified by amplifier 7. The automatic gain control (AGC) 8 adjusts the system gain so as to produce a constant noise level at its output, and the signal out of the AGC 8 is rectified by the rectifier 9. The peak detector 10 sets its output voltage equal to the highest voltage reached by the output of rectifier 9 and holds it at that value for at least the delay of the delay element 11. The peak detector 10 must be designed to reset between received pulses, and if the Sonar set has a gating system for rejection of transmit pulses and reverberation, the gating waveforms can be used to control resetting of the peak detector 10. This system for resetting peak detector 10 is represented in FIG. 1 by reset 12. The attenuator 13 then attenuates the output of the peak detector 10 by a predetermined value; and for maximum depth-sounding accuracy this value should be equal to the number of decibels below the point at which the envelope of the filtered input pulse has its greatest time derivative. A typical value is 7 decibels. However, for maximum margin against the case where the side lobe gets specular reflection while the main lobe gets bottom scattering, the attenuation should be somewhat less, and a practical system should enable the operator to choose the amount of attenuation depending upon conditions. The output of the attenuator 13 is, in turn, applied to the negative input terminal of the threshold circuit 14, which circuit provides one output signal when the difference between its two inputs is positive and a second output signal when the difference between the two inputs is negative. Thus the output of the threshold circuit 14 abruptly changes at the time when the two inputs are equal. The threshold circuit can be any one of a number of known circuits, e.g., a differential amplifier followed by a Schmitt trigger. The output of the attenuator 13 is prevented from becoming less than a predetermined minimum voltage by a voltage source 16, adjustable voltage divider 17, and the clamping action of the diode 18. The voltage divider 17 is adjusted so that the output of attenuator 13 is always greater than the noise level as measured at the output of the rectifier 9, and the impedance of the voltage divider 17 must be much smaller than the output impedance of attenuator 13 in order to insure proper clamping action. Although not shown in FIG. 1 this clamping circuit could be inserted into the system between the rectifier 9 and the peak detector 10 instead of after attenuator 13, as shown. The positive pulse output of the rectifier 9 is also applied to the delay element 11, which has unity gain. The delay element 11 introduces a time delay which must be longer than the worst-case time required for the output of the attenuator 13 to reach its peak value. The delay element 11 can be an FM-modulated sonic delay line, any other kind of modulated analog delay line, a magnetic tape, drum, or disk, or a digitally encoded shift register, memory, or magnetostrictive delay line.

The output of the delay element 11 is then applied to the positive input terminal of the threshold circuit 14. When the voltage at this point rises to the value of the voltage at the negative input terminal, which voltage is a specified number of decibels below the peak level which the voltage at the positive terminal will reach, the output of the threshold circuit 14 changes abruptly. This output of the threshold circuit 14 can be used to mark graphic recorders or to stop or otherwise operate electronic counters which measure depth digitally by counting elapsed time since transmission of the acoustic pulse. The time delays associated with the filter 6 and the delay 11 can be compensated for by advancing the time of acoustic pulse transmission with respect to the time datum for depth measurement. Thus, by using this detector, the threshold level is defined a specified number of decibels below the peak of the echo return pulse, and large variations in the signal level do not affect the depth reading or the side-lobe discrimination capability.

Figure 2:
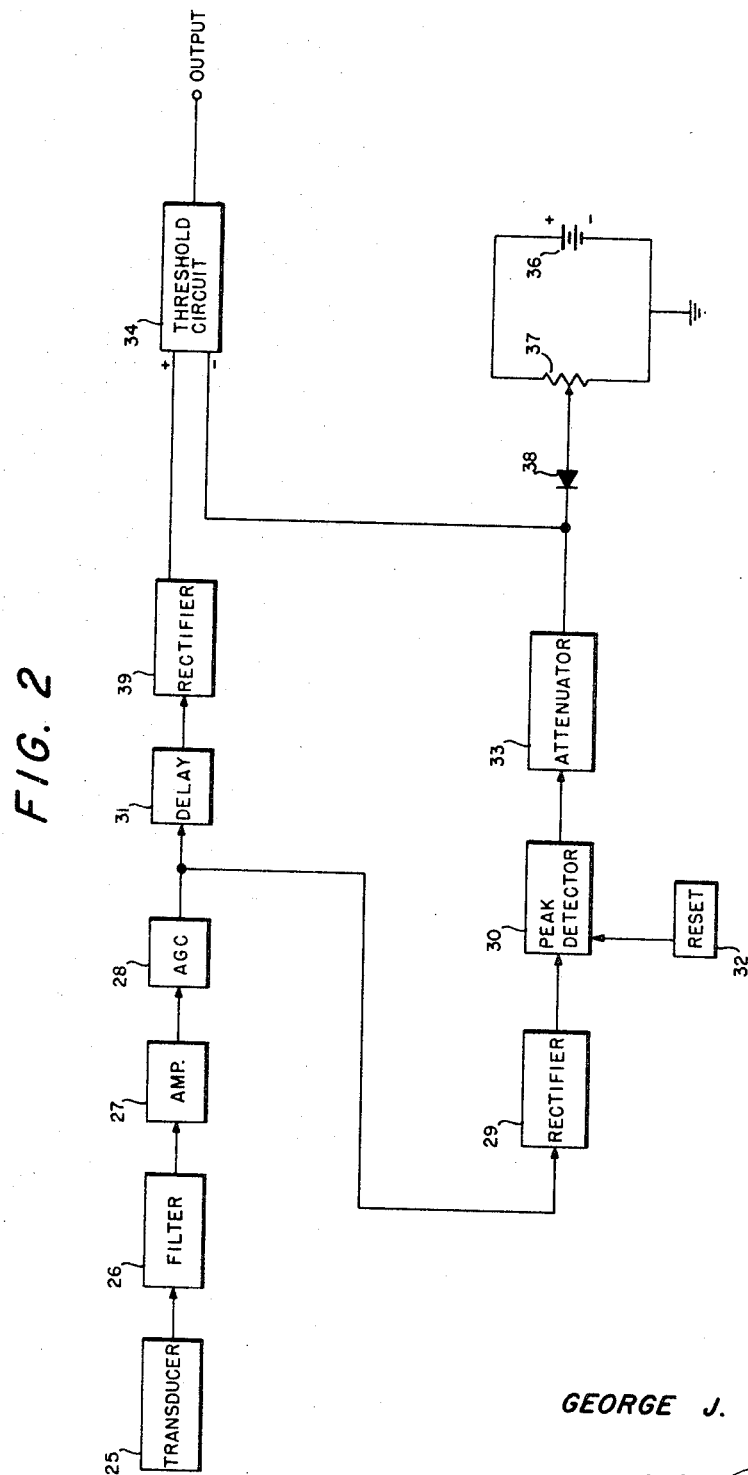
FIG. 2 illustrates a block diagram of a second embodiment of the invention.

An alternate configuration which permits use of a delay element designed to operate at carrier, rather than modulation, frequencies is shown in FIG. 2. The echo received by transducer 25 is applied to the filter 26, and after filtering, the signal is suitably amplified by amplifier 27. The AGC 28 adjusts the system gain so as to produce a constant noise level at its output, and the signal out of the AGC 28 is rectified by the rectifier 29. The peak detector 30 sets its output voltage equal to the highest voltage reached by the output of the rectifier 29, and holds it there for at least the delay of the delay element 31. Here again, the peak detector 30 must be designed to reset between received pulses, and where the Sonar set has a gating system for rejection of transmit pulses and reverberation, the gating waveforms can be used to control resetting of the peak detector 30. This type of a reset system is represented by the reset 32 in FIG. 2. At this point, the attenuator 33 attenuates the output of the peak detector 30 by a predetermined value, and the output of the attenuator 33 is applied to the negative input terminal of the threshold circuit 34. The voltage at the output of attenuator 33 is prevented from becoming less than the voltage determined by the voltage source 36 and the adjustable voltage divider 37 by the clamping action of the diode 38.

The output of the AGC 28 is also applied to the delay element 31, which introduces a time delay which must be longer than the worst-case time required for the output of the attenuator 33 to reach its peak value. The delay element 31, which has unity gain, is then rectified by the rectifier 39, the output of which is then applied to the positive input terminal of threshold circuit 34. When the voltage at the positive input terminal rises to the value of the voltage at the negative input terminal of the threshold circuit 34, the output of the circuit 34 changes abruptly. The output of the circuit 34 is then used for depth measurement in the same way as is the output of threshold circuit 14 in FIG. 1. Although not shown in FIG. 2, the clamping circuit comprised of the voltage source 36, voltage divider 37 and diode 38 could be placed in the system between rectifier 29 and peak detector 30 instead of after attenuator 33, as shown.

Numerous other alternative configurations are contemplated depending upon various conditions. For example, in applications where the noise level is small, the AGC may not be required, and the requirement for a constant hold level for the peak detectors can be relaxed with a few decibels of decay being permitted within the delay time of the delay elements. However, the attenuation of the attenuators must also be reduced by an equivalent amount. In this case, the peak detector may be merely an RC load to the rectifier immediately preceding it. In addition, if the attenuators are made adjustable they can be used to compensate for deviations of the respective delay elements from unity gain and gain differences between the two branches of the circuit. It should also be understood that if the rectifiers are designed to give negative outputs, instead of positive as illustrated, it will be necessary to reverse the voltage sources 16 and 36, the diodes 18 and 38, and the input terminals of the threshold circuits 14 and 34.

This detector system also could be organized to use a fixed threshold, and to stabilize the pulse amplitude. In that configuration, the negative input of the threshold circuit 14, for example, would be connected to an adjustable voltage source (not shown), and the output of the attenuator 13 would be used to control the gain of an amplifier (not shown), which would be inserted after the delay element 11.

The detector of this invention has an advantage over the fixed-threshold detection techniques used in the prior art, because this invention implements a controlled threshold a fixed number of decibels below the peak of the echo return pulse so as to make the depth reading independent of the amplitude of the echo pulse. In addition, this invention prevents variations in the amplitude of an echo pulse from adversely affecting the side-lobe rejection. This device is of relatively simple construction and, as a result, is lower in cost than similar prior art devices; and the analog technique utilized by this detector results in the absence of a quantization error in threshold definition which is present in the use of digitally controlled threshold detection techniques. Still another advantage of this detector is that it can be used to modify existing fixed-threshold Sonars, because its output format is similar to that of a fixed-threshold detector.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A controlled threshold detector for use in combination with Sonar transducer for facilitating distance determinations, the accuracies of which are independent of the amplitudes of the echo pulses, comprising:
   first means coupled to said transducer for rectifying electrical signals generated by said transducer when echo pulses are received therefrom;
   means coupled to said rectifying means for detecting the peak voltage from each echo pulse appearing at the output of said rectifying means and for providing an output voltage substantially equal to said peak voltage;
   means coupled to the output of said peak detecting means for attenuating the output voltage of said peak detecting means by a predetermined value;
   means coupled to said attenuating means for clamping the output voltage thereof;
   means coupled to said transducer for introducing a predetermined time delay to the signal generated by said transducer; and
   a threshold circuit having a first input electrically coupled to said delay means and a second input electrically coupled to said attenuating means.

2. The detector of claim 1 including:

means for resetting said peak detecting means between each echo pulse so as to enable said peak detecting means to detect the peak voltage generated by the next succeeding echo pulse.

3. The detector of claim 2, including:

an automatic gain control coupled between said transducer and said first rectifying means.

4. The detector of claim 3, including:

a filter coupled between said transducer and said automatic gain control.

5. The detector of claim 4 wherein said clamping means, includes:

a voltage source;

an adjustable voltage divider coupled across said voltage source; and a diode coupled between said attenuating means and said voltage divider.

6. The detector of claim 1 wherein the inputs of said delay means and said first rectifying means are in electrical common.

7. The detector of claim 6, including:

second rectifying means coupled between said delay means and the first input of said threshold circuit.

8. A controlled threshold detector for use in combination with a sonic transducer, comprising:

means coupled to said transducer for introducing a predetermined time delay to the signal generated by said transducer upon reception of sound by said transducer;

means coupled to said transducer for detecting the peak voltage generated by said transducer upon reception of each echo pulse and for providing an output voltage substantially equal to said peak voltage;

means coupled to said peak detector means for attenuating the amplitude of the signal output from said peak detector means by a predetermined amount whereby the maximum signal amplitude of the output of said delay means exceeds the maximum signal amplitude at the output of said attenuation means; and means coupled to said delay means and said attenuating means for simultaneously receiving and for comparing the instantaneous amplitudes of the signals from said delay means and from said attenuating means and for providing an output signal, the characteristics of which indicate the relationship between the signals from said delay means and said attenuating means.

9. The detector of claim 8 further including:

means for resetting said peak detecting means between each period of sound reception by said transducer so as to enable said peak detecting means to detect the peak voltage generated by the sound during the next succeeding period of sound reception.

References Cited
UNITED STATES PATENTS

| | | | |
|---|---|---|---|
| 3,176,293 | 3/1965 | Nolen et al. | 343—7 |
| 3,353,146 | 11/1967 | Vartanian | 340—3 |
| 3,380,018 | 4/1968 | Littrell et al. | 340—3 |

RICHARD A. FARLEY, *Primary Examiner.*

U.S. Cl. X.R.

343—7